(12) United States Patent
Okita et al.

(10) Patent No.: US 7,509,739 B2
(45) Date of Patent: Mar. 31, 2009

(54) METHOD OF MANUFACTURING FULL FACE VEHICLE WHEEL

(75) Inventors: Tomiharu Okita, Anjo (JP); Ryuji Kimoto, Anjo (JP); Katsumi Uchiyama, Anjo (JP); Yoshiki Inagaki, Anjo (JP)

(73) Assignee: Central Motor Wheel Co., Ltd., Anjo-Shi, Atchi (JP)

( * ) Notice: Subject to any disclaimer, the term of this patent is extended or adjusted under 35 U.S.C. 154(b) by 563 days.

(21) Appl. No.: 10/537,232

(22) PCT Filed: Oct. 18, 2004

(86) PCT No.: PCT/JP2004/015361

§ 371 (c)(1),
(2), (4) Date: May 31, 2005

(87) PCT Pub. No.: WO2006/043304

PCT Pub. Date: Apr. 27, 2006

(65) Prior Publication Data

US 2006/0248722 A1    Nov. 9, 2006

(51) Int. Cl.
*B23P 11/00*    (2006.01)
*B21K 1/32*    (2006.01)
*B60B 3/00*    (2006.01)

(52) U.S. Cl. ............... 29/894.322; 29/894.323; 29/525.14; 301/63.103; 301/63.104; 301/63.106

(58) Field of Classification Search ............ 29/894.3, 29/894.322, 894.323, 894.324, 894.351, 29/525.14, 894.32, 894.321, 894.325; 301/63.103, 301/63.104, 63.105, 63.106
See application file for complete search history.

(56) References Cited

U.S. PATENT DOCUMENTS 3,611,535 A * 10/1971 Nobach ............ 29/894.323
4,610,482 A * 9/1986 Overbeck et al. ...... 301/63.105
5,210,948 A * 5/1993 Seksaria et al. ............ 29/894
5,360,261 A * 11/1994 Archibald et al. ..... 301/63.107
5,417,476 A * 5/1995 Hasegawa et al. ..... 301/63.104
5,435,632 A * 7/1995 Gajor et al. .......... 301/63.105
5,435,633 A * 7/1995 Jaskierny ........... 301/63.105
5,551,151 A * 9/1996 Overbeck ............ 29/894.322
5,558,407 A * 9/1996 Jaskiery ............. 301/63.105
5,613,739 A * 3/1997 Sands ................. 301/95.11
6,030,051 A * 2/2000 Hosoda et al. ....... 301/63.105
6,138,355 A * 10/2000 Grassi ................. 29/894.323
6,282,788 B1 * 9/2001 Politi et al. .......... 29/894.323
6,447,071 B1 * 9/2002 Griffin ................ 301/63.104
6,491,351 B1 * 12/2002 Mikami ............... 301/63.101
6,508,517 B2 * 1/2003 Mikami ............... 301/63.103

(Continued)

FOREIGN PATENT DOCUMENTS

| JP | 60-54274 A1 | 3/1985 |
| JP | 4-305388 A1 | 10/1992 |
| JP | 8-253002 A1 | 10/1996 |
| JP | 2004-261833 A1 | 9/2004 |
| WO | WO-98/41410 A1 | 9/1998 |
| WO | WO-01/43991 A1 | 6/2001 |

*Primary Examiner*—Jermie E Cozart
(74) *Attorney, Agent, or Firm*—Darby & Darby PC

(57) ABSTRACT

A method of manufacturing a full face vehicle wheel having a high durability performance, in which the back surface of a wheel disk is provided in advance with an annular joining groove. A peripheral joining end of a wheel rim is provided in advance with an inside slope end surface. The peripheral joining end is seated and positioned on the bottom surface of the annular joining groove. A welding heat confining annular region is produced between the inside groove wall of the annular joining groove and the inside slope end surface. The annular joining groove and the peripheral joining end are joined by welding.

7 Claims, 5 Drawing Sheets

U.S. PATENT DOCUMENTS

| | | | |
|---|---|---|---|
| 6,663,190 B2 * | 12/2003 | Kashiwai et al. | 301/63.101 |
| 6,869,149 B2 * | 3/2005 | Tanaka | 301/63.104 |
| 7,270,382 B2 * | 9/2007 | Hodges et al. | 301/63.101 |
| 2003/0217466 A1 * | 11/2003 | Coleman | 29/894.32 |
| 2005/0184579 A1 * | 8/2005 | Bryant et al. | 301/63.105 |
| 2005/0252004 A1 * | 11/2005 | Francischetti | 29/894.323 |

* cited by examiner

METHOD OF MANUFACTURING FULL FACE VEHICLE WHEEL

CROSS-REFERENCE TO PRIOR APPLICATION

This is a U.S. National Phase application under 35 U.S.C. §371 of International Patent Application No. PCT/JP2004/015361, filed Oct. 18, 2004 which is incorporated by reference herein. The International Application has not published yet at the time of filing of this application.

TECHNICAL FIELD

The present invention relates to a method of manufacturing a full face vehicle wheel by welding a wheel rim to a wheel disk with its periphery having a flange portion for supporting a tire bead.

BACKGROUND ART

The full face vehicle wheel is manufactured by welding a wheel rim to a wheel disk. The wheel rim has a flange portion at one opening thereof and a peripheral joining end at the other opening. The wheel disk has a flange portion the periphery thereof for supporting a tire bead sidewise. The full face vehicle wheel is manufactured by welding the peripheral joining end to the back surface of the wheel disk. Here, according to a welding process generally in practice, the wheel rim and the wheel disk are placed coaxially in relation to each other with the peripheral joining end abutting the back surface of the wheel disk, and fillet welding is performed from outside along its entire circumference.

The weld portion where the wheel disk and the wheel rim are joined by welding is made of weld metal in which both parts have melted and mixed together. As the weld metal is formed in the state of sufficiently melted and mixed together, the full face vehicle wheel has a high joining strength and high durability performance. In order to make the weld metal in sufficiently melted and mixed state, some configurations have been proposed; for example, one in which the outside edge of the peripheral joining end of the wheel rim is chamfered and welded along the entire periphery (Patent Document 1), and another in which the peripheral joining end is bent toward the inside of the wheel rim by about a right angle and the bent portion is welded (Patent Document 2).

The back surface of the flange portion of the wheel disk and the outer surface of the bead seat portion adjacent the peripheral joining end of the wheel rim constitute a tire support and securing portion coming into contact with the tire bead. In order to appropriately support and secure the tire, a general standard for the tire and wheel is specified that a tangent circle of a radius R of 6.5 mm be contactable with the flange portion back surface and the bead seat portion outer surface. That is to say, according to the standard, it is required that a weld bead showing the surface feature of the weld of the wheel disk and the wheel rim be made on the flange portion back surface and the bead seat portion in a size that permits contact of a tangent circle of a radius R of 6.5 mm.

Patent Document 1: U.S. Pat. No. 5,435,633
Patent Document 2: U.S. Pat. No. 6,382,735 B2

DISCLOSURE OF THE INVENTION

Problems to be Solved by the Invention

In the configurations described above, one in which the outside edge of the peripheral joining end is chamfered (Patent Document 1) and another in which the peripheral joining end is bent toward the inside (Patent Document 2), a space is formed between both the components that narrows gradually from outside toward inside. As fillet weld is performed from outside so as to fill the space, weld portions of both the components are made in a state sufficiently melted and mixed together and also the weld bead is made in a size that permits contact of a tangent circle of a radius R of 6.5 mm. Here, the size and depth of the weld portion made of the weld metal increase with the amount of welding heat used under control of welding. Therefore, it is required to restrict the welding heat quantity so that the tangent circle of a radius R of 6.5 mm can contact. Incidentally, the welding heat quantity is the heat amount applied in welding and controlled according to, in arc welding for example, amperage, voltage, welding torch speed, etc.

Here, in a common full face vehicle wheel, the wall thickness of the wheel disk is greater than that of the wheel rim, so that the former is harder to heat in welding and absorbs more welding heat. As a result, with the welding heat quantity restricted to form a weld bead of a size that meets the specification of the tangent circle of a radius R of 6.5 mm in the conventional constitution described above, a state cannot be realized in which weld metal has mixed with the entire region of the peripheral joining end.

On the other hand, in recent years, the vehicle wheel tends to increase in the rim diameter. Along with the increased rim diameter, wall thickness of the wheel disk is increased to secure strength and durability of the wheel as a whole. Even if the rim diameter is increased, it is still required that the tangent circle of a radius R of 6.5 mm be contactable with the bead seat portion of the wheel rim and the flange portion of the wheel disk. Therefore, due to increased wall thickness of the wheel disk, the quantity of welding heat restricted with the weld bead size results in undesirably reduced size of region in which melting penetrates into the peripheral joining end of the wheel rim. Therefore, in order that the weld portion exhibit sufficient durability, also the wheel rim has been made with increased wall thickness. In this way, because the wheels of increased diameter also increase in weight due to increased wall thickness, it is much desired to reduce their weight. However, because reducing the wall thickness for reducing weight results in undesirable reduction in durability of the weld portion, it is desired to improve the durability.

Therefore, an object of the present invention is to provide a method of manufacturing a full face vehicle wheel capable of improving the wheel durability.

Means for Solving the Problem

The present invention relates to a method of manufacturing a full face vehicle wheel, wherein the back surface of the wheel disk is provided in advance with an annular joining groove; the peripheral joining end of the wheel rim is provided in advance with an inside slope end surface; said peripheral joining end is seated and positioned on the bottom surface of the annular joining groove; in which state, a welding heat confining annular region is produced between the inside groove wall of the annular joining groove and the inside slope end surface by placing the inside edge of the inside slope end surface in contact with or near said inside groove wall; and the annular joining groove and the peripheral joining end are joined by welding, so that the wheel disk and the wheel rim are joined.

According to the above manufacturing method, a welding heat confining annular region is produced between the inside groove wall and the inside slope end surface in the state of the peripheral joining end of the wheel rim positioned on the bottom surface of the annular joining groove of the wheel disk. Because the welding heat confining annular region prevents heat produced by welding in the peripheral joining end from escaping to the disk wheel, it is possible to sufficiently heat and melt the entire region of the inside slope peripheral surface of the peripheral joining end. In addition, the inside slope peripheral surface of the heated peripheral joining end causes welding heat to accumulate also in the welding heat confining annular region, which makes it possible to efficiently heat the inside groove wall and the bottom surface that constitute the annular joining groove. Therefore, this welding makes it possible to form weld metal region in the state in which the region up to the inside edge of the peripheral joining end, the inside groove wall, and the bottom surface have melted and mixed each other. As the annular joining groove is formed in the wheel disk having a greater wall thickness in comparison with the wheel rim, the wall thickness in the region where this annular joining groove is formed is reduced and the difference in wall thickness from the wheel rim is reduced. As a result, it is possible to equally heat both the annular joining groove and the peripheral joining end with the welding heat, so as to heat the peripheral joining end sufficiently up to its inside edge. Therefore, it is easy to form weld metal in which melt has reached the inside edge of the peripheral joining end.

When the annular joining groove formed on the back surface of the wheel disk is joined to the peripheral joining end by welding, weld metal is formed to fill a groove region located outside the peripheral joining end. Therefore, it is possible to restrict outward buildup size of the weld metal formed by welding. Even if a welding heat quantity sufficient for melting the region around the welding heat confining annular region is applied, it is possible to satisfy the specification that a tangent circle of a radius R of 6.5 mm be contactable with the bead seat portion and the flange portion. Here, for example, even in case a wheel rim has an increased wall thickness due to increased diameter and a welding heat quantity capable of sufficiently melting the region around the welding heat confining annular region is applied, it is possible to make a weld bead of weld metal satisfying the tangent circle of a radius R of 6.5 mm.

Therefore, this manufacturing method for welding together the wheel disk and the wheel rim makes it possible to form a weld bead in a size that meets the specification that a circle of a radius R of 6.5 mm be contactable with the bead seat portion and the flange portion and to form weld metal in a state in which the peripheral joining end has completely melted and mixed inside the peripheral joining end. Thus, it is possible to completely weld together the peripheral joining end and the annular joining groove, so that the full face wheel can exhibit improved durability in comparison with the conventional counterpart described above. The improvement in the durability may be translated into reduction in wall thickness of the wheel rim, which enables reduction in weight while retaining sufficient durability even with wheels having an increased diameter.

This manufacturing method also provides an advantage, in case the annular joining groove is formed so that the inside edge of the peripheral joining edge contacts the inside groove wall of the annular joining groove, positioning of the wheel rim and the wheel disk is facilitated in the direction of a plane perpendicular to the center axis. On the other hand, in case the annular joining groove is formed so that the inside edge of the peripheral joining edge is located near the inside groove wall of the annular joining groove, an excellent advantage is provided that, after both the components are welded together, whether or not the weld is made completely inside the peripheral joining edge is easily determined by visually observing the inside groove wall and the inside edge. Incidentally, even in case the inside edge is located near the inside groove wall, it is preferable to form the annular joining groove so that the inside edge fits into the annular joining groove (namely the entire inside slope peripheral surface fits in the annular joining groove) in the state of the peripheral contact end is placed in the groove.

Also, in the method of manufacturing the full face vehicle wheel, it is proposed that the inside slope end surface formed at the peripheral joining end of the wheel rim has a slope angle within a range greater than about three degrees and not greater than about 60 degrees relative to the bottom surface of the annular joining groove. With this constitution, it is easy to sufficiently heat the peripheral joining end with welding heat, and the heat is likely to accumulate more efficiently in the welding heat confining annular region. As a result, weld metal is easily formed in which the melt has reached deep inside the peripheral joining end and mixed with the inside groove wall and the bottom surface of the annular joining groove. Here, in order that the above effect is exhibited more appropriately, it is preferable to make the inside slope end surface with a slope angle greater than about five degrees and not greater than about 45 degrees. Incidentally, if the slope angle of the inside slope end surface is made greater than about 60 degrees, the distance in the depth direction from the bottom surface to the inside edge of the inside slope peripheral surface increases in the state of the peripheral joint end being positioned on the bottom of the annular joining groove. As a result, it becomes less easy to sufficiently heat with the heat accumulated in the welding heat confining annular region the inside groove wall of the annular joining groove up to a position where the inside groove wall is in contact or near the inside edge. This makes it difficult to form weld metal in which the inside edge of the peripheral joining end and the inside groove wall of the annular joining groove have completely melted and mixed together. On the other hand, if the slope angle of the inside slope end surface is made smaller than about three degrees, the distance in the depth direction along part of the inside groove wall of the annular joining groove on the back side of the inside edge of the peripheral joining end increases. As a result, part of the inside groove wall behind the inside edge cannot be heated with the heat accumulated in the welding heat confining annular region, which may result in producing a large back side weld bead that has not completely melted together with the inside groove. Such a back side weld bead is likely to develop cracks from the portion of insufficient melt, which may result in reduction in the amount of improvement in durability.

Also, in the method of manufacturing the full face vehicle wheel, it is proposed that the inside slope end surface of the peripheral joining end of the wheel rim is formed by bending the opening brim where said peripheral joining end is formed toward the inside of the wheel rim. With such a method, in the state of the peripheral joining end being positioned on the bottom surface of the annular joining groove, a space region narrowing from outside toward inside (tapering off) is formed between the outer surface of the peripheral joining end and the bottom surface of the annular joining groove. As the welding heat accumulates in this space region, it is easy to heat the peripheral joining end. This makes it easy to form weld metal in which melt has reached deep inside the peripheral joining end. In addition, because part of the inside of the annular joining groove outside the peripheral joining end positioned can be secured more widely, it is possible to further restrict outward buildup size of the weld metal.

Also, in the method of manufacturing the full face vehicle wheel, it is proposed that the outside groove wall of the annular joining groove is formed to tilt outward by an angle within a range greater than about 40 degrees and not greater than about 90 degrees relative to the bottom surface of the annular joining groove. This makes it easy to set a welding torch aimed at a position where the annular joining groove and the peripheral joining end are in contact with each other in the state of the peripheral joining end being positioned on the bottom surface of the annular joining groove, so that welding heat is easily transmitted to the welding heat confining annular region. Therefore, the functional effect of the present invention is more easily exhibited that weld metal is formed in which melt has reached sufficiently inside the peripheral joining end.

Effects of the Invention

In the method for manufacturing the full face vehicle wheel of the present invention, the annular joining groove is formed in advance on the back surface of the wheel disk; the inside slope end surface is formed in advance at the peripheral joining end of the wheel rim; the peripheral joining end is positioned on the bottom surface of the annular joining groove; in that state, the inside edge of the inside slope end surface is placed in contact with or near the inside groove wall of the annular joining groove to produce the welding heat confining annular region between the inside groove wall and the inside slope end surface; and the annular joining groove and the peripheral joining end are welded together by welding from outside the wheel rim to join together the wheel disk and the wheel rim. Therefore, the manufacturing method provides the following effects:

a) The welding heat confining annular region makes it possible to sufficiently heat and melt the entire inside slope surface of the peripheral joining end and also efficiently heat the inside groove wall and the bottom surface of the annular joining groove by the heat accumulated in the welding heat confining annular region.

b) Because the thickness of the area where the annular joining groove is formed is reduced, the peripheral joining end and the annular joining groove are equally heated, and the peripheral joining end is heated sufficiently up to its inside edge.

c) Because the weld metal is formed to fill the annular joining groove, the specification that a tangent circle of a radius R of 6.5 mm be contactable with the bead seat portion and the flange portion is met even if an amount of heat is applied that can melt deep inside the peripheral joining end.

d) Therefore, the weld portion is made in a state in which melting has reached deep inside the peripheral joining end while meeting the specification that a tangent circle of a radius R of 6.5 mm is contactable with the bead seat portion and the flange portion.

e) The full face vehicle wheel manufactured by this manufacturing method exhibits high durability performance. It is possible to reduce the wall thickness of the wheel rim, resulting in reduction in weight while maintaining sufficient durability.

Figure 1:
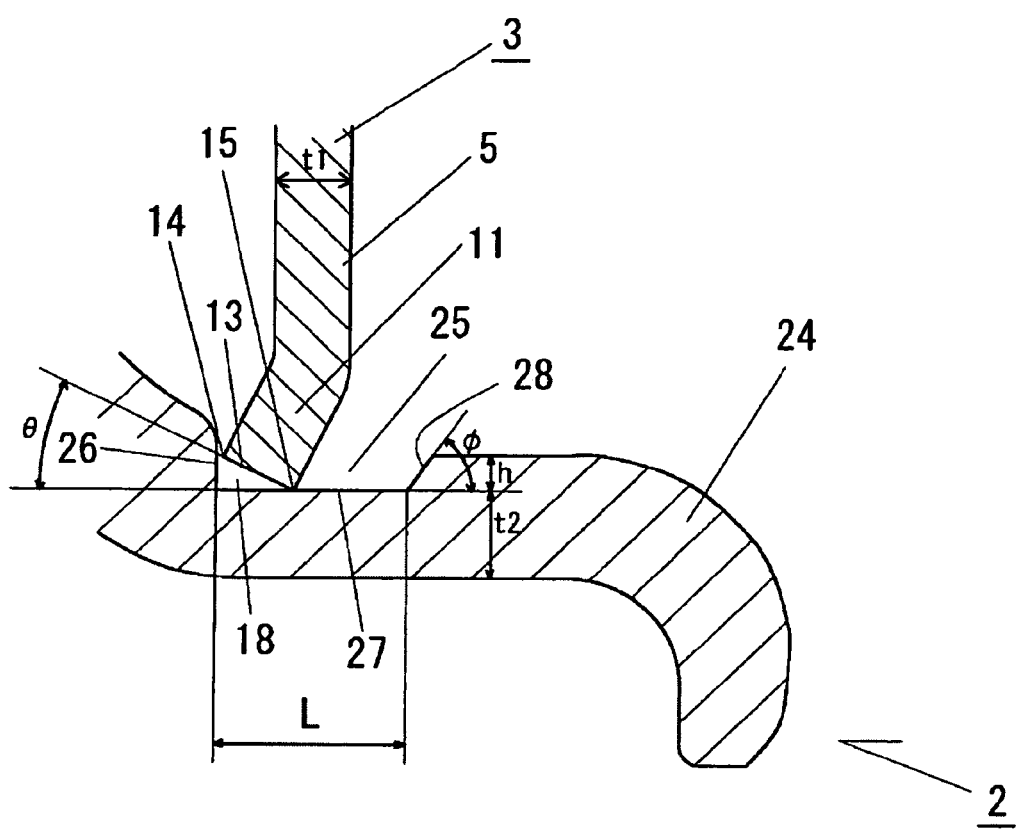
FIG. 1 is an enlarged sectional view, showing a peripheral joining end 11 of a wheel rim 3 that is seated in position in an annular joining groove 25 of a wheel disk 2.

DESCRIPTION OF SYMBOLS 1 full face vehicle wheel
2 wheel disk
3 wheel rim
4 bead seat portion
5 bead seat portion
7 drop portion
10 flange portion
11 peripheral joining end
12 weld portion
13 inside slope peripheral surface
14 inside edge
18 welding heat confining annular region
24 flange portion
25 annular joining groove
26 inside groove wall
27 bottom surface
30 weld metal
31 weld bead

BEST MODE FOR CARRYING OUT THE INVENTION

The method of manufacturing the full face vehicle wheel according to the present invention is described in reference to the drawings.

Figure 2:
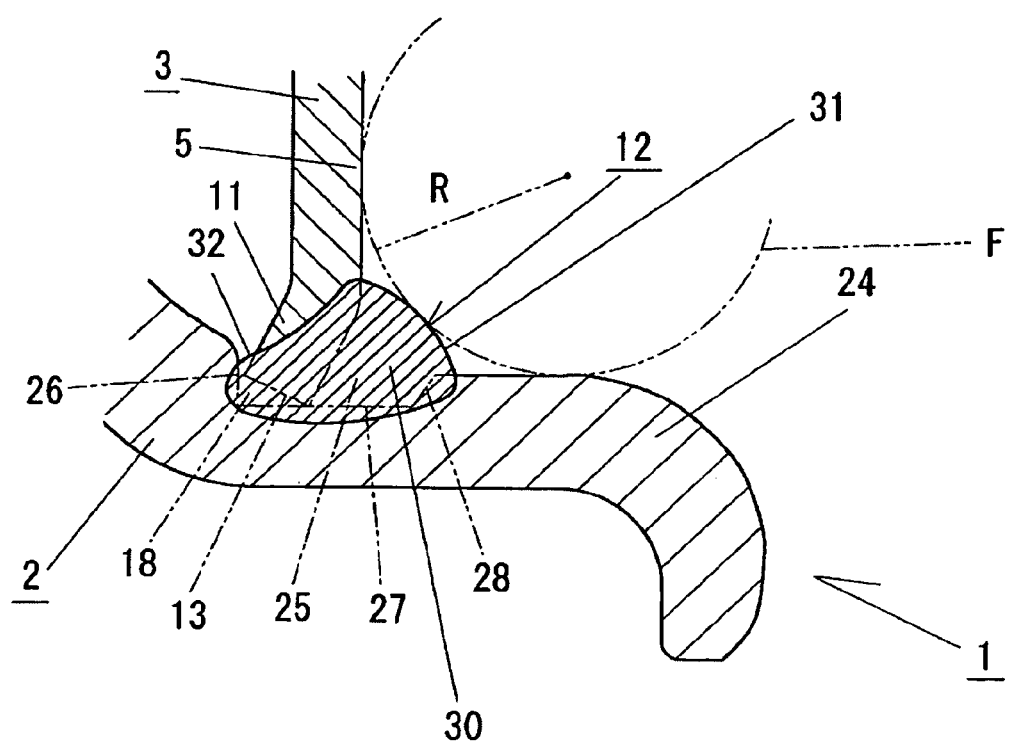
FIG. 2 is an enlarged sectional view, showing the peripheral joining end 11 and the annular joining groove 25 that are welded together.
Figure 3:
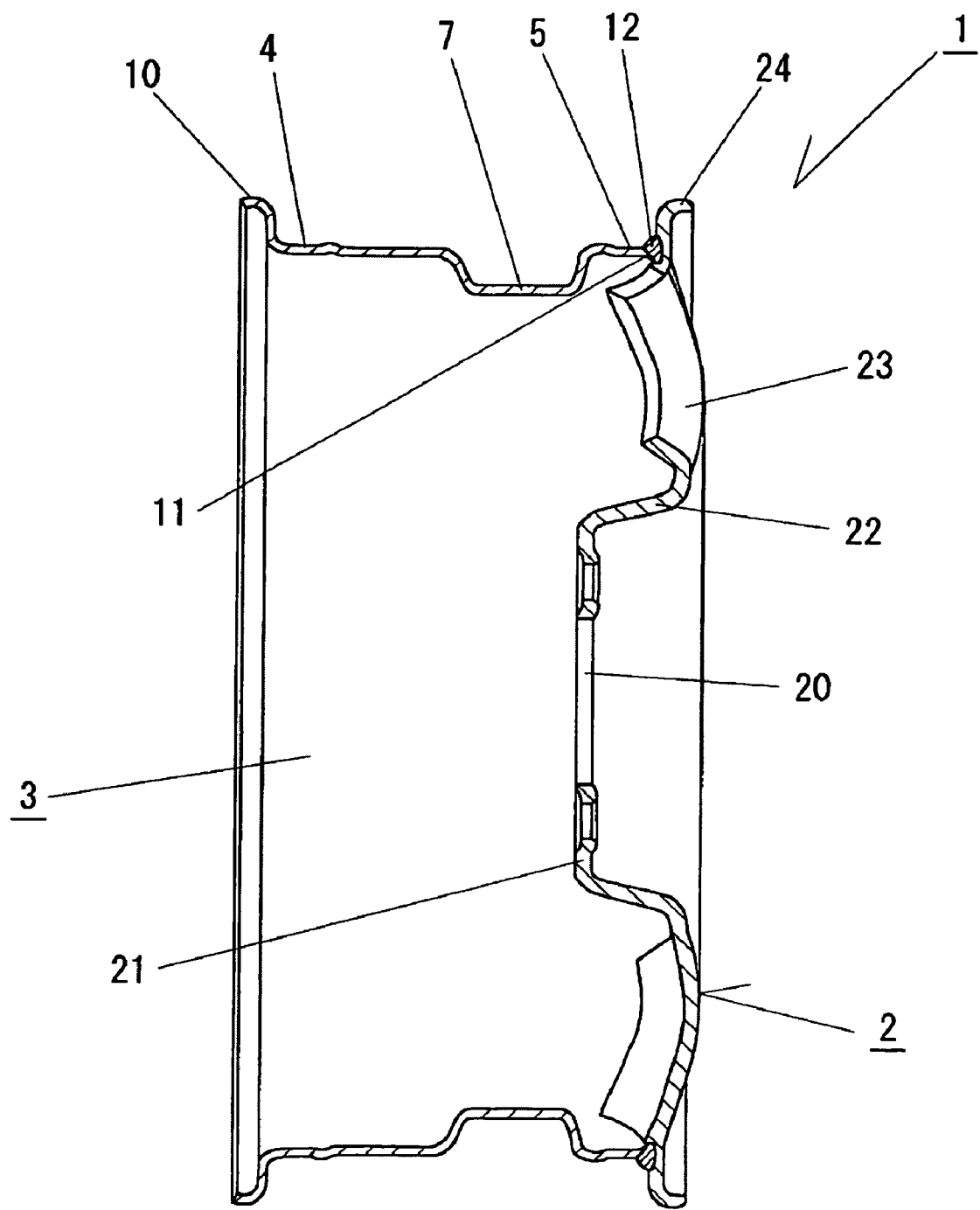
FIG. 3 is a sectional view, showing a full face vehicle wheel.

The full face vehicle wheel 1 as shown in FIG. 3 includes: a wheel rim 3 with its one open peripheral end formed to be a flange portion 10 and the other open peripheral end formed to be a peripheral joining end 11; and a wheel disk 2 with its periphery formed to be a flange portion 24. The peripheral joining end 11 is fillet welded to the back surface of the wheel disk 11, resulting in a single component (as shown in FIG. 2). The fillet welding produces a weld portion 12. Here, arc welding is used for the fillet welding.

This full face vehicle wheel 1 is made by forming the wheel disk 2 and the wheel rim 3 in separate processes and then joining them by arc welding. In this embodiment, the wheel disk 2 and the wheel rim 3 are made of steel.

The wheel rim 3 is made of a generally rectangular steel plate with its short sides butt-joined to form a cylindrical work, followed by roll forming with roll dies (not shown) of specified shapes such that the cylindrical work is squeezed and pressed from inside and outside by respective dies as the work is rotated. The wheel rim 3 formed by the above rolling process has at its one open periphery a flange portion 10 for holding a tire bead sidewise. The flange portion 10 is formed so as to continue into a bead seat portion 4 on which the tire bead is to be seated. At the other open periphery is formed the peripheral joining end 11 which is formed so as to continue into the other bead seat portion 5. A drop portion 7 for dropping the tire bead on is formed between the bead seats 4 and 5 formed at both openings of the wheel rim 3. The peripheral joining end 11 is an essential part of the present invention, which will be described later in detail.

On the other hand, the wheel disk 2 is formed by pressing (not shown) a generally rectangular steel plate. The press-formed wheel disk 2 is provided with a hub attachment portion 21 having a hub hole 20 in the center. Outside the hub attachment portion 21 is formed a concentric annular cosmetic portion 23 with its inside circumference having a rising portion 22 rising toward the outer side of the wheel disk 2. A flange portion 24 is formed outside the periphery of the cosmetic portion 23.

Incidentally, the full face wheel disk 1 made by joining together the wheel disk 2 and the wheel rim 3 is to hold a tire from both sides by means of the flange portions 10 and 24 when the tire is attached by placing its beads on the bead seat portions 4 and 5 of the wheel rim 3.

Next, the essential part of the present invention is described.

In this embodiment, the wheel rim 3 is formed with the peripheral joining end 11 bending toward inside of the rim at the other opening having not flange portion 10 (as shown in FIG. 3). The wheel rim 3 is made, as described above, of a generally rectangular steel plate which is made into a cylinder and roll-formed. Here, the open end face before being roll-formed is approximately a plane extending at a right angle to the rim axis. An open end brim where the flange portion 10 is not formed is bent from outside inward using dies (not shown), so that the open end face faces inward to form the inside slope peripheral surface 13 of the invention. Thus, the peripheral joining end 11 is formed which is provided with the inside slope peripheral surface 13.

On the other hand, the annular joining groove 25 is formed in a region of the back surface of the wheel disk 2 that is formed continuously into to the flange portion 10 (as shown in FIGS. 1 and 3). This annular joining groove 25 is formed by cutting process using a cutting machine such as a lathe. As shown in FIG. 1, this annular joining groove 25 is made up of: an inside groove wall 26 of approximately the same diameter as that of the inside edge 14 of the inside slope peripheral surface 13 of the peripheral joining end 11 formed on the wheel rim 3 centered on the center axis of the wheel disk 2; a bottom surface 27 made as a horizontal surface approximately at a right angle to the center axis; and an outside groove wall 28 which is concentric with the inside groove wall 26.

Here, the inside groove wall 26 is made approximately parallel to the center axis. It is constituted that the inside edge 14 of the peripheral joining end 11 is in contact with or near the inside groove wall of the annular joining groove when the peripheral joining end 11 is positioned on the bottom surface 27 of the annular joining groove 25. The outside groove wall 28 is formed to slope outward so that the annular joining groove 25 widens toward outside (See FIG. 1). Here, the outside groove wall 28 is formed to slope by an angle φ greater than about 40 degrees and not greater than 90 degrees to the bottom surface 27 of the annular joining groove 25. The depth h of the annular joining groove 25 is formed so as to be greater than the height in the rim axis direction of the inside slope peripheral surface 13 of the peripheral joining end 11. The depth h is also made so that the wall thickness t2 at the bottom surface 27 is greater than the wall thickness t1 of the wheel rim 3. Incidentally, if the wall thickness t2 is made smaller than the wall thickness t1 of the wheel rim 3, there is a concern of problems such as weld cracks because welding heat is transmitted more easily toward the front face of the wheel disk 2.

As shown in FIG. 3, the peripheral joining end 11 of the wheel rim 3 is also bent so that its inside slope peripheral surface 13 makes a slope angle θ that is greater than three degrees and not greater than 60 degrees relative to the bottom surface of the annular joining groove 25 in the state of the peripheral joining end 11 being positioned on the annular joining groove 25. In addition, the length of the peripheral joining end 11 (the length from the bent point to the inside slope peripheral surface 13) is greater than the wall thickness t1 of the wheel rim 3.

In this embodiment, a wheel of 15 inches in rim diameter is exemplified. The wheel rim 3 is assumed to be about 3.5 mm in wall thickness t1, the wheel disk 2 to be about 6.5 mm thick, and the flange portion 24 of the wheel disk 2 to be about 5.5 mm thick. The slope angle θ of the inside slope peripheral surface 13 of the peripheral joining end 11 formed in the wheel rim 3 is about 30 degrees. The length from the bent point to the inside slope peripheral surface 13 (the length of the peripheral joining end 11) is about 6.0 mm. The depth h of the annular joining groove 25 formed in the wheel disk 2 is about 2.0 mm, the radial direction width L of the bottom surface 27 is about 8.0 mm, and the slope angle φ of the outside groove wall 28 is about 45 degrees. Here, the wall thickness t2 of the portion where the bottom surface 27 of the annular joining groove 25 is formed is about 3.5 mm.

Here, the annular joining groove 25 formed as described above in geometry has a sufficient groove capacity outside the peripheral joining end 11 in the state of the peripheral joining end 11 seated and positioned. Therefore, the weld metal 30 formed so as to fill the annular joining groove 25 can meet the specification that a tangent circle of a radius R of 6.5 mm be contactable even when welding heat is applied in a quantity that causes the weld metal 30 to completely melt and mix with the peripheral joining end 11.

Next, arc welding (MAG welding or $CO_2$ gas arc welding) is applied to join the wheel rim 3 and the wheel disk 2 formed as described above.

While the center axes of both parts are aligned as shown in FIG. 1, the peripheral joining end 11 of the wheel rim 3 is seated and positioned on the bottom surface 27 of the annular joining groove 25 of the wheel disk 2. In this state, the outside edge 15 of the inside slope peripheral surface 13 of the peripheral joining end 11 is in contact with the bottom surface 27 of the annular joining groove 25, and the inside edge 14 is near the inside groove wall 26. Also in this state, a welding heat confining annular region 18 is produced as surrounded by the inside groove wall 26, the bottom surface 27 of the annular joining groove 25, and the inside slope peripheral surface 13 of the peripheral joining end 11.

In this way, the peripheral joining end 11 is positioned in the annular joining groove 25 and arc welding is performed from outside the wheel rim 3. The arc welding is made with a welding torch (not shown) aimed at the space region formed between the outer surface of the peripheral joining end and the bottom surface of the annular joining groove to become narrower from outside toward inside (tapering off). Here, the wheel rim 3 and the wheel disk 2, in the above-described positioned state, are turned as a whole about their axes so that arc welding is applied along their entire circumference.

In this arc welding, welding heat quantity is adjusted through welding voltage, turning speed, etc. to restrict the size of the weld bead 31 that builds up outside so that a tangent circle F of a radius R of 6.5 mm is contactable with the back surface of the flange portion 24 for contact-supporting the tire bead, and the outer surface of the bead seat portion 5 (See FIG. 2). This welding heat quantity also prevents the weld bead 31 from building up higher than the annular joining groove 25 inside the peripheral joining end 11. This is because the weld bead built up largely inside the peripheral joining end 11 tends to be in a shape that swell largely inward from the inside circumferential surface of the peripheral joining end 11, which is likely to cause breakage on the border with the inside circumferential surface and lessen the extent of improvement in durability.

When the arc welding as described above is started, electric arc strikes between the welding rod of the welding torch, and the peripheral joining end 11 of the wheel rim 3, and the annular joining groove 25 of the wheel disk 2. Welding heat causes the area around the peripheral joining end 11 and the annular joining groove 25, as well as the welding rod to start melting. Here, because of a small difference between the wall thickness t1 of the wheel rim 3 and the wall thickness t2 of part of the wheel disk 2 where the annular joining groove 25 is formed, it is possible to balance in heating both parts so that the heat can conduct sufficiently and appropriately to the area around the peripheral joining end 11 and the annular joining groove 25. Besides, because the welding heat confining annular region 18 is provided, heat is prevented from escaping from the peripheral joining end 11 to the annular joining groove 25. In other words, this welding heat confining annular region 18 exhibits heat insulation effect for containing heat within the peripheral joining end 11 and sufficiently heating it. Thus, the peripheral joining end 11 is sufficiently heated up to the inside edge 14 of the inside slope peripheral surface 13 and starts melting. Moreover, heat radiates from the heated inside slope peripheral surface 13 to the welding heat confining annular region 18 and collects there. This heat heats up the inside groove wall 26 and the bottom surface 27 of the annular joining groove 25 that form the welding heat confining annular region 18. The welding rod melts to be in liquid state metal as intended and flows in from the torch aiming position to fuse the peripheral joining end 11 and the annular joining groove 25 that have started melting. Furthermore, the liquid state metal that has flowed in fuses with the peripheral joining end 11 and moves ahead to fill the welding heat confining annular region 18 and also fuses with the inside groove wall 26 and the bottom surface 27 that have been heated with the welding heat confining annular region 18. In this way, the welding rod melts to be liquid state metal and fuses with the weld-heat-melted peripheral joining end 11 and the inside groove wall 26 and the bottom surface 27 of the annular joining groove 25 heated with the welding heat confining annular region 18. As a result as shown in FIG. 2, the weld metal 30 is formed in which melting has reached fully or deep inside the peripheral joining end 11. As the welding is completed along the entire circumference, the wheel rim 3 and the wheel disk 2 are joined, resulting in the full face vehicle wheel 1 according to the present invention.

As for the full face vehicle wheel 1, the weld portion 12 of the wheel rim 3 and the wheel disk 2 is formed, as shown in FIG. 2, such that the weld metal 30, in which the area around the annular joining groove 25 and the peripheral joining end 11 are fused, fills the annular joining groove 25. The weld bead 31, the outer part of the weld metal 30, is formed so that a tangent circle F of a radius R of 6.5 mm is contactable with the flange portion 24 and the bead seat portion 5. Furthermore, the weld bead 31 on the inner side is formed not to build up larger than the annular joining groove 25.

Here, even if the arc welding is performed with a quantity of welding heat that allows the inner part of the peripheral joining end 11 to melt completely, the weld metal 30 formed to fill the annular joining groove 25 meets the specification that the tangent circle F of a radius R of 6.5 mm be contactable. In other words, the quantity of welding heat controlled so as to make the tangent circle F of a radius R of 6.5 mm contactable is the quantity that causes the peripheral joining end 11 to melt completely inward.

Then, the full face vehicle 1 manufactured as described above was put to a radial load durability test. The radial load durability test is one of the most important methods for evaluating the wheel durability and has relatively close relationship with the weld portion 12 of the wheel rim 3 and the wheel disk 2. In this test, a radial load is applied to a tire mounted wheel by rotating at a constant speed. The number of rotations up to the time the wheel develops cracks or deformation is used as an index of durability. This test was conducted according to JIS D 4103. Here, the radial load was set to about 1400 kN.

This test for radial load durability was also conducted on full face vehicle wheels 51 and 61 of conventional configurations as comparative examples shown in FIG. 5.

Figure 5A:
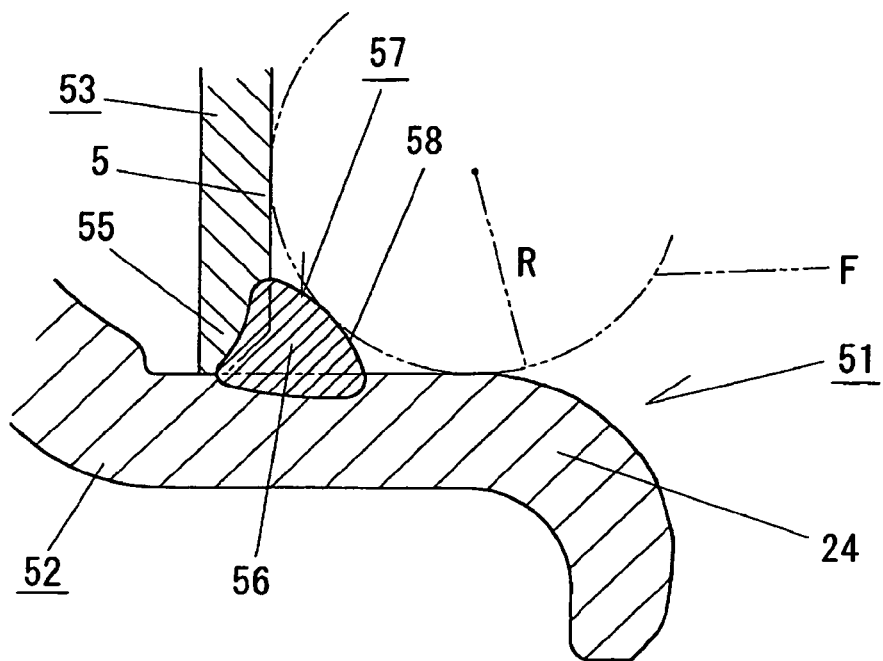
FIGS. 5(A)-5(B) are enlarged sectional views, showing a weld portion of a wheel rim and a wheel disk in a conventional configuration.

In one comparative example, or the full face vehicle wheel 51 shown in FIG. 5(A), the outside edge of the wheel rim 53 on the open end side at which a flange portion is not formed is chamfered to be a peripheral joining end 55. Besides, unlike in the above embodiment, the back surface of the wheel disk 52 is not provided with an annular joining groove and the region where the peripheral joining end 55 of the wheel rim 53 is to be joined is generally flat. The peripheral joining end 55 of the wheel rim 53 is brought into contact with the back surface of the wheel disk 52 with their center axes approximately aligned. Then arc welding is performed from outside the wheel rim 53 to join the wheel rim 53 and the wheel disk 52. Here, in the arc welding, the quantity of welding heat is controlled so that the tangent circle F of a radius R of 6.5 mm is contactable with the bead seat portion 5 of the wheel rim 53 and the flange portion 24 of the wheel disk 52. This quantity is made smaller than that in the above embodiment. In the full face vehicle wheel 51 manufactured as described above, the weld portion 57 is formed in a state in which the weld metal 56 has not reached inner part of the peripheral joining end 55. This comparative example of full face vehicle wheel 51 is of the same constitution as the above embodiment except that the shape of the peripheral joining end 55 of the wheel rim 53 is changed and no annular joining groove is formed on the wheel disk 52, and the same portions are represented by the same reference numerals without their explanation.

Figure 5B:
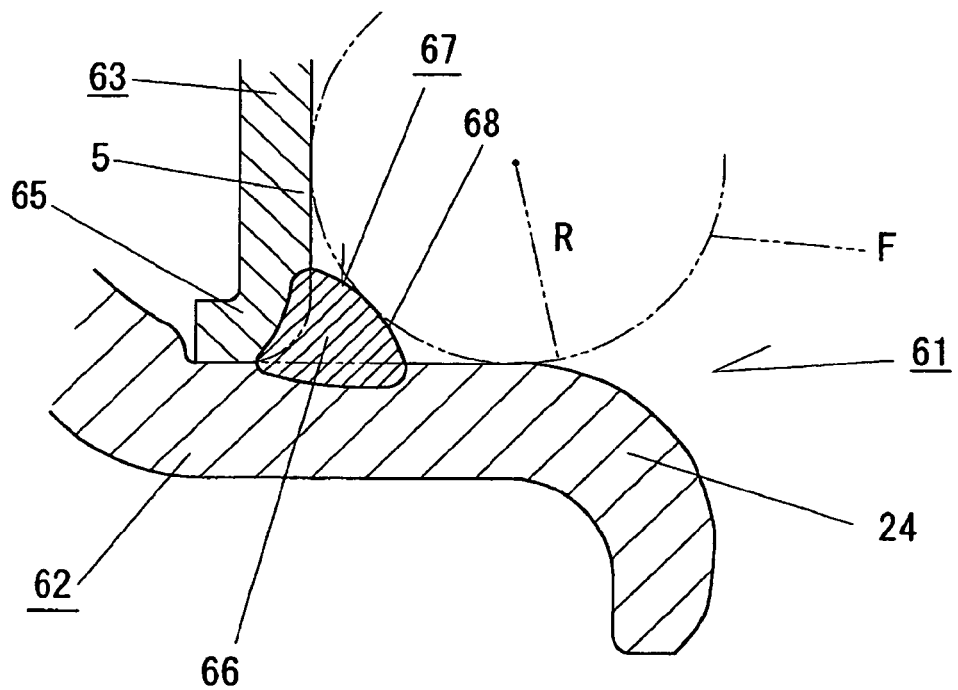

As another comparative example, a full face vehicle wheel 61 shown in FIG. 5(B) is fabricated. Here, the open end edge of the wheel rim 63 where a flange portion is not formed is bent inward nearly at a right angle to the center axis to form a peripheral joining end 65. On the other hand, similar to the comparative example above, the region of the wheel disk 62 to which the peripheral joining end 65 of the wheel rim 63 is to be joined is generally flat. The peripheral joining end 65 of the wheel rim 63 is brought into contact with the back surface of the wheel disk 62 with their center axes approximately aligned. Then arc welding is performed from outside the wheel rim 63 to join the wheel rim 63 and the wheel disk 62. Here, in the arc welding, the quantity of welding heat is controlled so that the tangent circle F of a radius R of 6.5 mm is contactable with the bead seat portion 5 of the wheel rim 63 and the flange portion 24 of the wheel disk 62. This quantity is made smaller than that in the above embodiment. In the full face vehicle wheel 61 manufactured as described above, the weld portion 67 is formed in a state in which the weld metal 66 has not reached inner part of the peripheral joining end 65. This comparative example of full face vehicle wheel 61 is of the same constitution as the above embodiment except that the shape of the peripheral joining end 65 of the wheel rim 63 is changed and no annular joining groove is formed on the wheel disk 62, and the same portions are represented with the same reference numerals without their explanation.

These full face vehicle wheels 51, 61 as comparative examples and the full face vehicle wheel 1 of the above embodiment are put to a test for radial load durability to compare their durability. As a result, the comparative example, the full face vehicle wheel 51, developed cracks in the weld portion 57 after about 2,000,000 rotations. The other comparative example, the full face vehicle wheel 61, developed cracks in the weld portion 67 after about 2,500,000 rotations. On the other hand, the full face vehicle wheel 1 of the embodiment exhibited no anomaly beyond 4,000,000 rotations. From these tests, it was confirmed that the full face vehicle wheel 1 of the embodiment exhibits longer durability in comparison with the conventional configurations.

Because the full face vehicle wheel of this embodiment exhibits high durability performance as described above, the improvement in durability may be used to reduce the wall thickness of the wheel rim. That is to say, the weight of the full face vehicle wheel may be reduced. Therefore, it is possible to reduce the weight of full face wheels that tend to increase in diameter in recent years and to increase their market value.

Figure 4A:
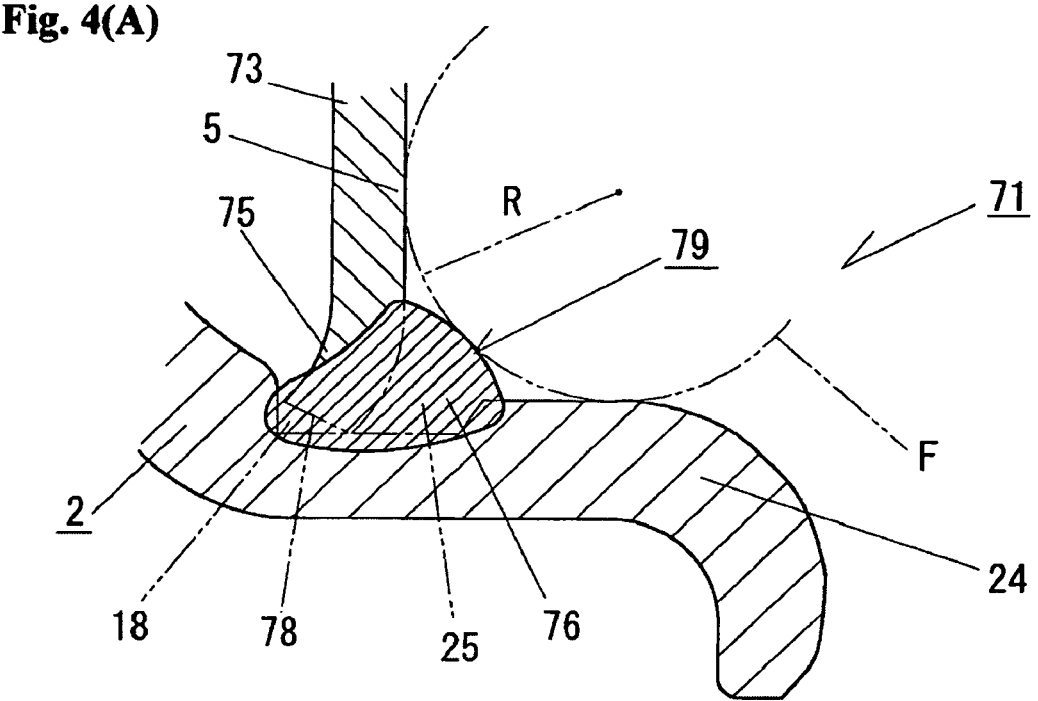
FIGS. 4(A)-4(B) are enlarged sectional views, showing a peripheral joining end and an annular joining groove that are welded together, according to another embodiment.

Another manufacturing method different from the above embodiment is exemplified. A shown in FIG. 4(A), the circumferential opening edge of the wheel rim 73 on the side on which a flange portion is not formed is formed in an arcuate shape curving inward to be a peripheral joining end 75. Also this peripheral joining end 75, like the above embodiment, is provided with an inside slope peripheral surface 78 that is open inward. The peripheral joining end 75 of the wheel rim 73 is seated and positioned in the annular joining groove 25 of the wheel disk 2 and both components are joined by arc welding like the above description. Here, the weld portion 79 is formed in the state in which the weld metal 76 has completely melted to the inside of the peripheral joining end 75. Thus, a full face vehicle wheel 71 is obtained.

Figure 4B:
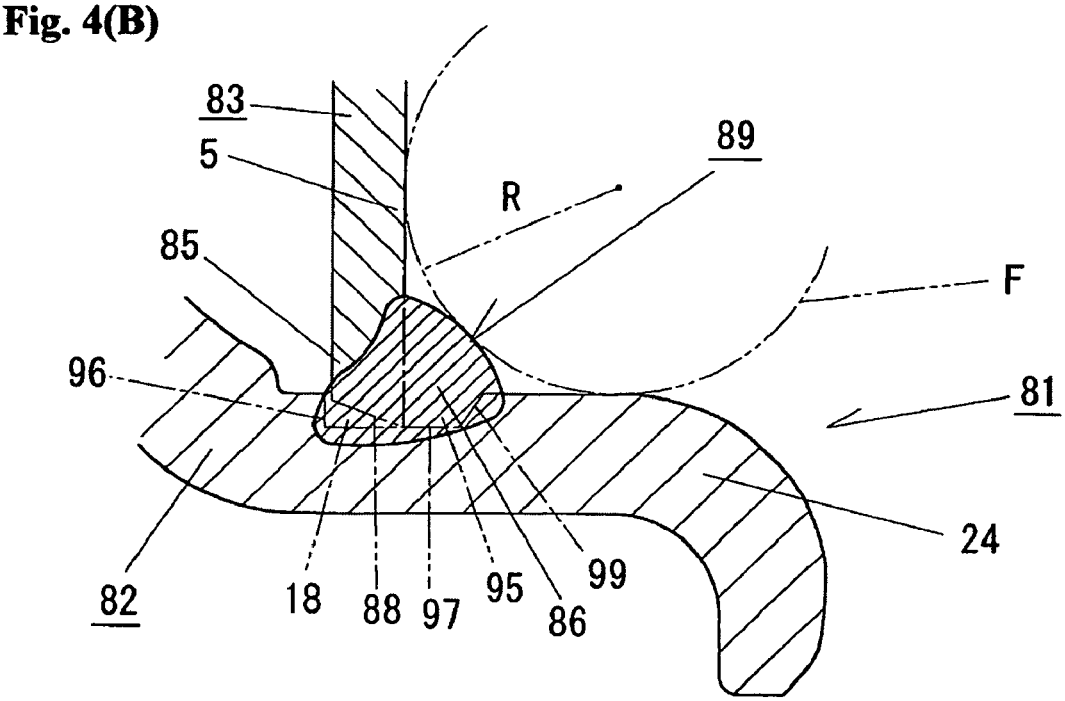

Or, as shown in FIG. 4(B), the inside circumferential edge of the opening of the wheel rim 83 on the side on which a flange portion is not formed is cut to form a peripheral joining end 85 having an inside slope peripheral surface 88. An annular joining groove 95 having an inside groove wall 96 nearly the same in diameter as the inside circumferential surface of the peripheral joining end 85 of the wheel rim 83 is formed on the back surface of the wheel disk 82. The outside groove wall 99 of the annular joining groove 95 is formed so that the annular joining groove 95 has a sufficiently large groove volume outside the peripheral joining end 85. After positioning the peripheral joining end 85 of the wheel rim 83 on the bottom surface 97 of the annular joining groove 95 of the wheel disk 82, both parts are joined by arc welding. Here, the weld portion 89 is formed in the state in which the weld metal 86 has completely melted and entered completely the inside of the peripheral joining end 85. Thus, a full face vehicle wheel 81 is obtained.

Also, in the full face vehicle wheel 71, 81 manufactured as described above it is possible, like the above embodiment, to form the weld portion 79, 89 made of the weld metal 76, 86 in which melting has reached completely inside the peripheral joining end 75, 85 while the tangent circle F of a radius R of 6.5 mm is contactable and the welding heat confining annular region in the positioned state described above. Therefore, it is also possible to prove high durability in the test for radial load durability and make the wheel lightweight. Incidentally, the constitution described here is the same as that of the full face vehicle wheel 1 described before except the peripheral joining end 75, 85 of the wheel rim 73, 83 are made in different shapes. Therefore, the same components are represented by the same reference numerals without repeating the same explanation.

As for the manufacturing method of the full face vehicle wheel 1 embodied as described above, it is preferable to interconnect the bottom surface and the outside groove wall of the annular joining groove of the wheel disk 2 through a smoothly curved surface. It is also preferable to interconnect the outside groove wall and the back surface of the wheel disk through a smoothly curved surface. This makes it possible to relieve stress concentration produced in sharp corners, and to cause liquid state metal of molten welding rod to fill the groove easily and thoroughly so that it can melt and mix with the wheel disk. On the other hand, it is also preferable to connect the inside groove wall to the bottom surface of the annular joining groove and to the back surface of the wheel disk through a smoothly curved surface. This makes it possible to provide the same effects as described above. Smooth, continuous forming of the inside and outside groove walls, and the wheel disk back surface prevents incongruous appearance of the weld.

The invention claimed is:

1. A method of manufacturing a full face vehicle wheel comprising the steps of:
    providing a wheel rim with one opening brim thereof formed to be a flange portion while the other opening brim is formed to be a peripheral joining end;
    providing a wheel disk with the periphery thereof formed to be a flange portion for supporting a tire bead sidewise, with said peripheral joining end being configured to be welded to the back surface of said wheel disk,
    providing the back surface of the wheel disk in advance with an annular joining groove;
    providing the peripheral joining end of the wheel rim in advance with an inside slope peripheral surface;
    seating and positioning said peripheral joining end on the bottom surface of the annular joining groove, thereby forming a welding heat confining annular region as a void surrounded by an inside groove wall of the annular joining groove, a bottom surface of the annular joining groove and the inside slope peripheral surface of the peripheral joining end; and
    welding the annular joining groove to an edge of the peripheral joining end at an outside surface of the wheel rim, such that weld metal is formed to fill the welding heat confining region and the wheel disk and the wheel rim are joined.

2. The method of manufacturing the full face vehicle wheel of claim 1, wherein the inside slope end surface formed at the peripheral joining end of the wheel rim has a slope angle within a range greater than about three degrees and not greater than about 60 degrees relative to the bottom surface of the annular joining groove.

3. The method of manufacturing full face vehicle wheel of claim 1, further comprising the steps of:
    forming the inside slope end surface of the peripheral joining end of the wheel rim by bending the opening brim where said peripheral joining end is formed toward the inside of the wheel rim.

4. The method of manufacturing the full face vehicle wheel of claim 1, further comprising the steps of:
    forming the outside groove wall of the annular joining groove to tilt outward by an angle within a range greater than about 40 degrees and not greater than about 90 degrees relative to the bottom surface of the annular joining groove.

5. The method of manufacturing the full face vehicle wheel of claim 1, wherein said welding step fuses an entire surface of the an inside slope peripheral surface to form liquid-state metal which fills the welding heat confining annular region, and joins the annular joining groove and the peripheral joining end so that the wheel disk and the wheel rim are joined.

6. A method of manufacturing a full face vehicle wheel comprising the steps of:

providing a wheel rim with one opening brim thereof formed to be a flange portion while the other opening brim is formed to be a peripheral joining end;

providing a wheel disk with the periphery thereof formed to be a flange portion for supporting a tire bead sidewise, with said peripheral joining end being configured to be welded to the back surface of said wheel disk, providing the back surface of the wheel disk in advance with an annular joining groove;

providing the peripheral joining end of the wheel rim in advance with an inside slope peripheral surface;

seating and positioning said peripheral joining end on the bottom surface of the annular joining groove, thereby forming a welding heat confining annular region as a void surrounded by an inside groove wall of the annular joining groove, the bottom surface of the annular joining groove and the inside slope peripheral surface of the peripheral joining end, and forming an outside space in the annular groove that opens away from an outside surface of the peripheral joining end; and welding the annular joining groove to an edge of the peripheral joining end by flowing metal in a liquid state melted from welding wire to fill said outside space, such that the annular joining groove and the peripheral joining end are melted by the liquid-state metal and the liquid-state metal fills the welding heat confining annular region, so that the wheel disk and the wheel rim are joined.

7. The method of manufacturing the full face vehicle wheel of claim 6, wherein said welding step fuses an entire surface of the an inside slope peripheral surface to form liquid-state metal which fills the welding heat confining annular region, and joins the annular joining groove and the peripheral joining end so that the wheel disk and the wheel rim are joined.

* * * * *

UNITED STATES PATENT AND TRADEMARK OFFICE
CERTIFICATE OF CORRECTION

| | |
|---|---|
| PATENT NO. | : 7,509,739 B2 |
| APPLICATION NO. | : 10/537232 |
| DATED | : March 31, 2009 |
| INVENTOR(S) | : Tomiharu Okita et al. |

It is certified that error appears in the above-identified patent and that said Letters Patent is hereby corrected as shown below:

In the Title Page, item[73]:

Assignee residence should read "Anjo-Shi, Aichi (JP)".

Signed and Sealed this

Twenty-fourth Day of November, 2009

David J. Kappos
*Director of the United States Patent and Trademark Office*